Sept. 18, 1956
C. BREER
2,763,456
BIPOD CAMERA SUPPORT
Filed Aug. 8, 1951
3 Sheets-Sheet 1
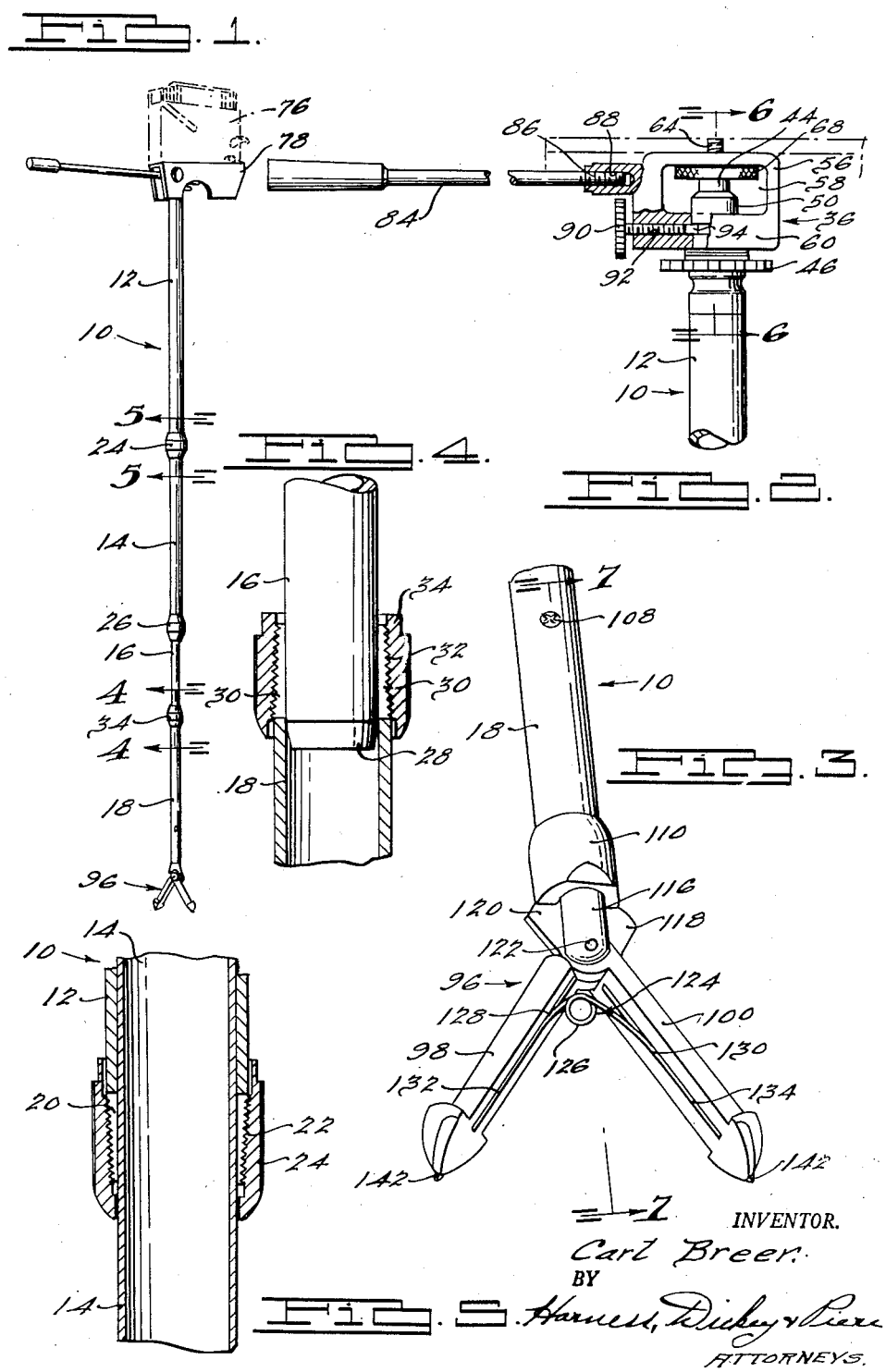
INVENTOR.
Carl Breer.
BY
Harness, Dickey & Pierce
ATTORNEYS.

Sept. 18, 1956     C. BREER     2,763,456
BIPOD CAMERA SUPPORT
Filed Aug. 8, 1951     3 Sheets-Sheet 2
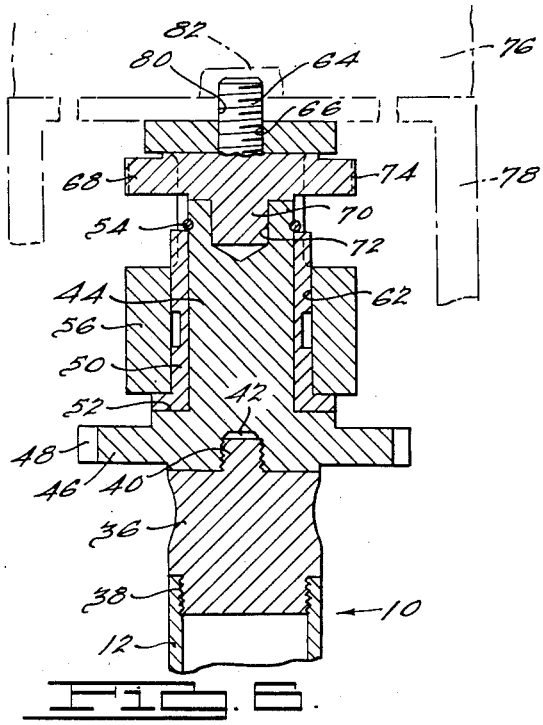
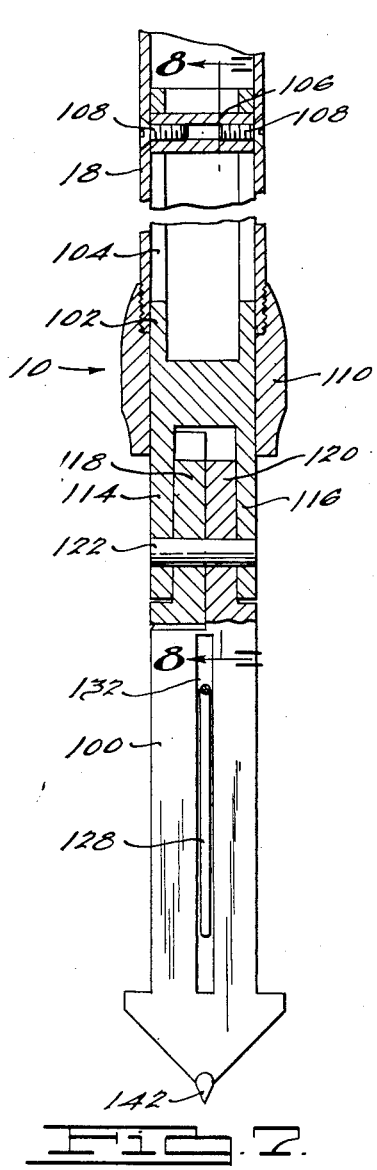
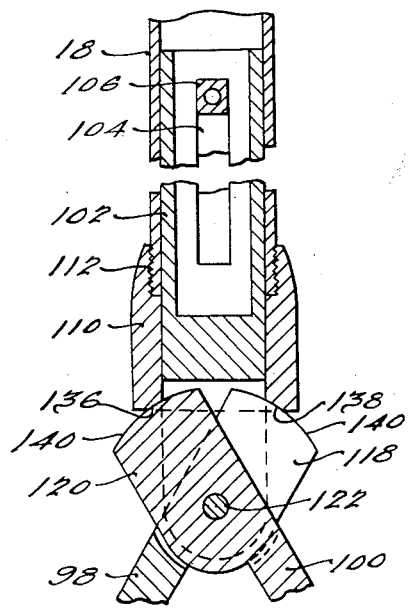
INVENTOR.
Carl Breer.
BY
Harness, Dickey & Pierce
ATTORNEYS.

Sept. 18, 1956  C. BREER  2,763,456
BIPOD CAMERA SUPPORT
Filed Aug. 8, 1951  3 Sheets-Sheet 3
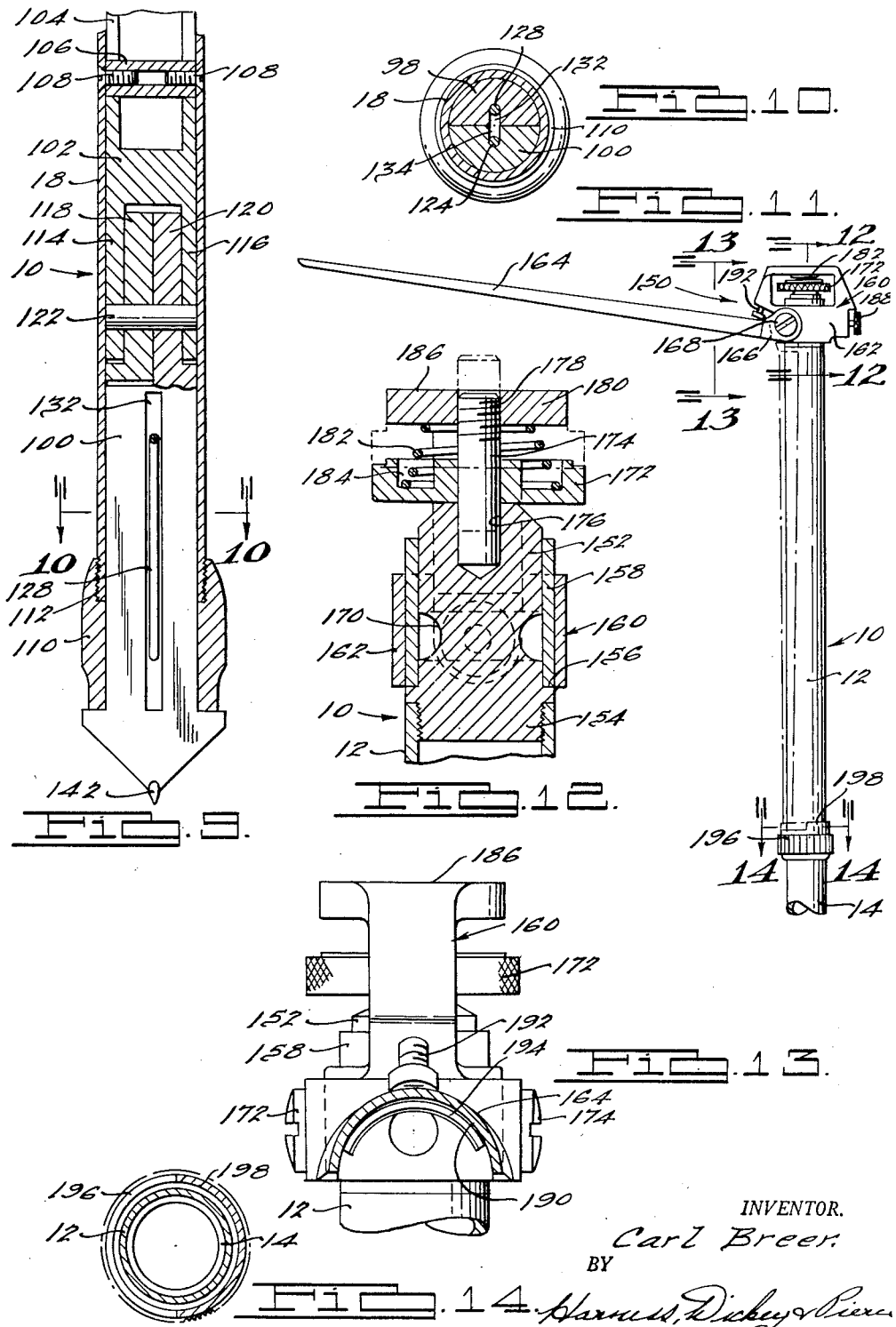
INVENTOR.
Carl Breer.
BY
Harness, Dickey & Pierce
ATTORNEYS.

United States Patent Office 2,763,456
Patented Sept. 18, 1956

2,763,456

BIPOD CAMERA SUPPORT

Carl Breer, Pasadena, Calif.

Application August 8, 1951, Serial No. 240,970

3 Claims. (Cl. 248—186)

This invention relates broadly to a device for supporting a camera and for holding it firm and steady in use.

Various types of camera tripods and the like have been developed, but all are objectionable in one respect or another. For example, many of these supports are relatively heavy and are awkward to carry. In most instances, they serve no useful purpose when not actually supporting a camera. Very few of these devices are adapted to support a camera for both vertical and horizontal panning. Most commercially available supports of the collapsible type are flimsy and do not offer a solid and stable footing to assure best photographic results. To my knowledge, none of these devices can be adapted for supporting and steadying the camera against the body of the user so as to have utility when taking pictures from a moving object such as an automobile, a train, or an airplane.

An important object of the present invention is to provide a camera support of improved construction which obviates the objections pointed out above to conventional supports.

Another object of the invention is to provide a camera support that is light in weight, simple in construction, efficient in operation, and relatively inexpensive to manufacture.

Other objects and advantages of the invention will be apparent during the course of the following description.

In the drawings forming a part of this specification and wherein like numerals are employed to designate like parts throughout the same:

Fig. 1 is a side elevational view of a camera support embodying the invention and showing a camera attached thereto;

Fig. 2 is an enlarged, fragmentary, side elevational view showing the upper portion of the support and particularly illustrating the head upon which the camera actually rests, parts of the head being broken away for clearness of illustration;

Fig. 3 is an enlarged, fragmentary, perspective view showing the lower portion of the support and particularly illustrating the pivoted legs which form a bipod lower end for the staff;

Fig. 4 is an enlarged, fragmentary, longitudinal sectional view taken on the line 4—4 of Fig. 1;

Fig. 5 is an enlarged, fragmentary, longitudinal sectional view taken on the line 5—5 of Fig. 1;

Fig. 6 is an enlarged, longitudinal sectional view taken on the line 6—6 of Fig. 2;

Fig. 7 is an enlarged, longitudinal sectional view taken on the line 7—7 of Fig. 3 and showing the bipod legs extended from the support;

Fig. 8 is an enlarged, fragmentary, longitudinal sectional view taken on the line 8—8 of Fig. 7;

Fig. 9 is a longitudinal sectional view similar to Fig. 7 but showing the bipod legs retracted within the staff of the support;

Fig. 10 is a transverse sectional view taken on the line 10—10 of Fig. 9;

Fig. 11 is a fragmentary, side-elevational view showing a modified construction embodying the invention;

Fig. 12 is an enlarged, fragmentary, longitudinal sectional view taken on the line 12—12 of Fig. 11;

Fig. 13 is an enlarged, transverse sectional view through a pivoted handle forming a part of the support and showing the handle extended at right angles to the staff; and Fig. 14 is an enlarged, transverse sectional view taken on the line 14—14 of Fig. 11.

In the drawings, wherein for the purpose of illustration is shown a preferred embodiment of the invention, the numeral 10 designates an elongated staff consisting of a plurality of retractable and extensible telescoping sections 12, 14, 16, and 18. It is contemplated that certain features embodying the present invention may be used on a staff that is fixed as to length. However, for maximum efficiency in use and in order to achieve maximum versatility and convenience in operation, the staff preferably comprises the telescoping sections shown. All the telescoping sections shown preferably are made from tubular, extruded aluminum stock to assure a lightweight structure.

Section 12 is larger in diameter than the other sections of the staff. The lower terminal portion of section 12 is provided with longitudinal slots 20 and the slotted portion thereof is provided with downwardly tapered, external threads 22 which receive a correspondingly internally threaded sleeve nut 24.

The adjacent section 14 is slightly smaller in diameter than section 12 and it fits snugly within the internal bore of the latter section as perhaps best shown in Fig. 5. When the sleeve nut 24 is loose on section 12, section 14 can be readily reciprocated back and forth in the larger section 12. However, when the sleeve nut 24 is tightened, it forces the slotted terminal of section 12 into pressed frictional engagement with section 14 so as to hold the latter securely against independent, longitudinal movement. If desired, section 14 may be formed in any suitable or conventional manner so that it cannot be withdrawn entirely from the upper section 12. In practice, the sleeve nut 24 usually is tightened on the upper section 12 with the intermediate section 14 either fully extended as shown in Fig. 1 or retracted fully into the upper section. It will be readily apparent, however, that there will be occasions when it will be desirable to adjust the length of the staff by tightening the nut with section 14 in partially extended position.

The next lower section 16 is related to and associated with section 14 in the same manner that the latter section is related to and associated with section 12, and the slotted lower end of section 14 is similarly provided with a sleeve nut 26 which is operative to hold section 16 fully retracted, fully extended, or in a selected intermediate position. The lower end of section 16 preferably is provided with a hard rubber tip 28, as shown in Fig. 4, for reasons hereinafter described in detail.

The bottom section 18 conveniently may be the same diameter as section 14 and it similarly fits over the intermediate section 16, as shown in Fig. 4. In this instance, the upper terminal portion of section 18 is provided with longitudinal slots 30, and the slotted portion is longitudinally tapered and threaded, as at 32. An internally threaded sleeve nut 34 is screwed onto the threads 32; and when tightened, it holds the two sections 16 and 18 securely together. Preferably only the lower terminal portion of section 16 is inserted in section 18 (Fig. 4) so that substantially the full length of section 16 is available by telescoping adjustment into and from section 14.

From the foregoing it will be readily apparent that when the various sections of the staff are fully collapsed, section 14 is disposed substantially entirely within section 12 and section 16 is disposed entirely within section 14. When the sections are thus positioned, sleeve nut 26 is disposed immediately adjacent sleeve nut 24 and sleeve nut 34 is disposed immediately adjacent sleeve nut 26. The lower section 18 in effect extends from the upper section 12, being separated from that section only by the intervening sleeve nuts 24 and 26.

It is contemplated that the device have utility as a walking cane when the sections are fully collapsed or in a suitable, partially collapsed condition. Accordingly, the sections should be sufficiently short so that when all the sections are collapsed in the manner described, the total length of the staff will not be greater than the minimum length required for use of the device as a cane by a person of normal stature. Manifestly, the length required of the staff for use as a walking cane may vary somewhat, depending upon the size of the person using it and upon the conditions of use, and it will be apparent that the sections of the staff can be partially extended to provide a cane of any suitable length falling within the minimum and maximum length of such as staff. Of course, if an exceedingly short walking stick were desired, the lower section 18 could be removed, in which event the rubber tip 28 would form the lower end of the staff. However, it is desired and contemplated that the device be useful either as a walking stick or as a camera support without complete removal of any part therefrom. If this is done there are no parts that may become lost or misplaced when using the device in one capacity or another.

On the upper end of the staff 10 is a head 36 forming a camera support, and in order to fasten the head 36 to the staff the upper section 12 is provided with a union 38. The latter is suitably fixed to the upper section 12 and may be either detachably or permanently fastened to the head 36. In the form of the invention shown, the union 36 is threaded into the upper end of section 12 as shown at 38. It preferably is generally cylindrical in form and is of the same outside diameter as section 12 so that it in effect comprises a longitudinal extension of the section.

On the upper end of the union 36 is a threaded stud 40 which extends into an internally threaded socket 42 provided centrally in the bottom of a bearing shaft 44. For convenience in attaching the head 36 to the staff 10, the shaft 44 preferably is provided adjacent the lower end thereof with a radial flange 46 which extends beyond the sides of the housing and the end of the staff, and the periphery of the flange preferably is scalloped as at 48. The flange 46 in effect comprises a handwheel that is readily accessible for use when threading the head onto or removing it from the stud 40. A bearing bushing 50 fits snugly on the shaft 44 and is held downwardly against a radial shoulder 52 on the shaft by a snap ring 54.

The actual part of the head 36 which supports the camera is a cast metal housing 56 here shown to be generally rectangular in form and having a central opening 58. The lower part 60 of the housing 56 has an opening 62 which fits over and snugly receives the bearing bushing 50, and the housing is free to turn on the bushing. Both the shaft 44 and the bushing 50 terminate in opening 58. A screw 64 extends upwardly through an opening 66 in the top of housing 56 and the lower portion of the screw is formed integrally with a radially extending portion 68 which fits snugly between the end of shaft 44 and the overlying portion of the housing 56 (Fig. 6). Below the flange 68 is a depending stud 70 which fits snugly but rotatably in a correspondingly shaped socket 72 provided in the end of shaft 44. The periphery of flange 68 preferably is knurled, as at 74, and the flange projects sufficiently laterally of the housing 56 so that it is readily accessible for manual operation. Thus, the flange 68 in effect comprises a thumb nut that is manually operable to screw stud 64 into the mounting bushing with which cameras are conventionally provided. The opening 66 necessarily fits the threaded stud 64 relatively loosely, and the flange 60 therefore preferably fits relatively snugly between the shaft 44 and the housing 56. In any event, however, the journaled engagement of stud 70 with the socket 72 provides a bearing for the mounting stud and compensates for any sloppiness in fit that may result from manufacturing tolerances or otherwise.

In Fig. 1 I have shown a camera 76 of conventional design and construction mounted on the head 56. While it is contemplated that the camera be mounted directly on the head it sometimes is desirable, particularly in the case of a relatively large camera, to provide a relatively larger supporting bracket 78 between the camera and the housing. The bracket 78 here shown is generally channel-shaped and is positioned on the head 56 in inverted position, as shown in Fig. 1, with the stud 64 projecting upwardly through a suitable opening 80 (Fig. 6) provided therein. The purpose of bracket 78 is to provide a larger supporting surface for the camera 76. The stud 64 extends upwardly through bracket 78 and into the mounting bushing 82 of the camera 76, and all the parts are held securely assembled when the screw is properly tightened.

In use, the staff 10 is used as a hand cane with the head 56 attached, and the top surface of the housing 56 preferably is made flat and smooth so as to provide a comfortable hand rest for the user.

The pivotal mounting of housing 56 permits it to turn readily on the bearing bushing 50 and thus permits it to swing the camera about the axis of shaft 44 for horizontal panning. To this end, a handle 84 is provided having a threaded end 86 which screws into an internally threaded opening 88 in housing 56 (Fig. 2). The handle 84 is readily removable, if desired; but when attached to the housing as shown, it provides a conveniently accessible handle that can be readily operated manually to swing the housing 56 and the camera 76 in a panning motion.

In many instances it is desirable, however, to lock the housing 56 against rotation or to regulate to some extent the ease with which the housing turns on the staff. In order to accomplish this purpose the housing 56 is equipped with a pressure screw 90 which operates in an internally threaded opening 92 in the lower portion of the housing and extends radially from the shaft 44 (Fig. 2). A suitable pressure shoe 94 of soft metal or the like preferably is interposed between the bearing 50 and the screw 90 to prevent the latter from scoring the bearing. The resistance offered by shoe 94 to turning of the housing 56 can be easily regulated by the adjusting screw 90, and when the latter is tightened down hard it acts through the shoe 94 to positively lock the housing 56 against rotation.

In order to provide a solid, stable footing for the device, the lower staff section 18 is provided with a ground-engaging unit 96. The particular ground-engaging unit here shown is in the form of pivoted prongs 98 and 100. When extended or spread apart as shown in Fig. 3 the prongs form a bipod support for the staff. It is a feature of this invention that the prongs 98 and 100, when folded together, are retractable into the lower staff section 18, and in this position the prongs mutually cooperate to provide a single unipod support for the staff (Fig. 9).

The particular ground-engaging unit 96 here shown has a hollow, cylindrical slide 102 which fits snugly and reciprocally in the tubular staff section 18. Longitudinal slots 104 are provided at diametrically opposite sides of the slide 102 and these slots receive a cross pin 106 which extends diametrically entirely across the section 18, as shown in Fig. 7, and is held securely attached to the section by screws 108. The pin 106 preferably is square in cross section as shown in Fig. 8, and it fits the slots 104 relatively snugly to minimize torsional lost motion between the slide and the staff. The slide 102 is reciprocable in section 18 within limits defined by slots 104. When fully retracted the slide is disposed entirely within staff section 18 as shown in Fig. 9; and when fully advanced, the slide projects beyond the lower end of the staff. The staff section 18 is here shown provided with a hardened metal ferrule 110 suitably fixed to the lower end of the section as by threads 112. The ferrule 110 provides a bearing for prongs 98 and 100 and sustains the weight of the device and of camera 76 as well as downward pressure imposed on the staff when the device is in use. Thus, the ferrule construction is desirable when the staff is made from relatively thin-walled, lightweight tubing, or whenever the material of the tubing is essentially soft. As shown, the ferrule merely comprises an extension of the staff section 18. Thus the ferrule in effect comprises a part of the lower section 18 and when it is stated that the slide 102 projects from the section 18 it is intended that it project from any appurtenance or appendage of the section, such as the ferrule, for example.

At the lower or outer end of the slide 102 are bifurcations 114 and 116 which embrace the upper ends 118 and 120 of prongs 98 and 100. A pivot 122 extends through bifurcations 114 and 116 and the upper prong portions 118 and 120 to pivotally unite the prongs with the slide 102.

The prongs 98 and 100 preferably are semicylindrical in transverse section, as shown in Fig. 10, and they are arranged so that the flat sides can be brought together. When the prongs 98 and 100 are folded together in this manner they form a cylindrical piece which snugly fits within the lower staff section 18. The upper portions 118 and 120 of the prongs are essentially flat and they pivotally unite the prongs scissors-fashion. Thus, when the prongs 98 and 100 are folded or collapsed, the pivoted portions 118 and 120 thereof are disposed within the confines of staff section 18 so that the entire ground-engaging unit can be retracted bodily into the staff section to the position shown in Fig. 9.

It is desirable that prongs 98 and 100 open immediately and automatically as soon as they disengage the staff section 18, and in order to accomplish this purpose a spring 124 is interposed therebetween. The spring 124 here shown has a flat intermediate loop 126 and extending arm portions 128 and 130 received within longitudinal slots 132 and 134 provided in the flat inner sides of the prongs. The loop 126 is essentially flat and is received within the slots 132 and 134 when the prongs are collapsed.

In order that the ground-engaging unit 96 support the lower end of the staff 10, the slot 104 is uniquely positioned so that the inner ends of the prongs operate in slots 136 and 138 at opposite sides of the ferrule 110 when the unit is fully extracted. Further, the inner ends of the prong sections 118 and 120 are arcuately curved, as at 140, and the curved ends bear against the bottom surfaces of the slots (Fig. 8). By reason of the fact that the pivoted prong portions 118 and 120 are disposed side by side, the slots 136 and 138 necessarily are offset with respect to each other; and by reason of the offset relation between slots 136 and 138, the pivoted portions 118 and 120 engage the internal wall of the ferrule to limit pivotal movement of the prongs.

By reason of the above construction the bipod prongs 98 and 100 provide a solid support for the staff when the prongs are extended and spread apart as shown in Fig. 3. If desired, the ends of the prongs may be provided with hardened steel pins 42 which engage hard, smooth surfaces and prevent the device from slipping. When thus supported, the staff 10 is free to turn on pivot 122 for vertical panning, and during the panning movement the slots in the ferrule 110 bear solidly and constantly on the arcuate ends of the prongs. Thus, the grooves 136 and 138, in addition to the force of the two prongs pressing on the hinge pin 122, lock the structure against torsional lost motion. By reason of the fact that the inner ends of prongs 98 and 100 engage the ferrule to limit pivotal movement of the staff, the prongs are prevented from becoming cocked out of position when at the extreme angle. The cross pin 106 assures that the prongs are automatically lined up with slots 136 and 138 when the ground-engaging unit is pulled out of the staff. When the ground-engaging unit is fully extracted, spring 124 spreads the prongs automatically to the fully extended position. While spring 124 is sufficiently strong to spread the prongs 98 and 100 easily and quickly, it does not prevent the prongs from being collapsed easily for insertion of the ground-engaging unit into the tubular end of the staff; and when the unit is retracted the spring presses the prongs outwardly against the surrounding staff section 18 to hold the unit securely in retracted position.

Reference is now had to Figs. 11–14, which show a modified form of the invention. The staff 10 and the ground-engaging unit 96 are identical in both forms of the invention. However, the camera-supporting head 150 is constructed somewhat differently in the modified form and it is attached differently to the staff 10.

The modified head construction comprises a pivot or journal 152 having a lower stud portion 154 threaded into the upper end of staff section 12. The upper end of the journal is reduced in diameter to define a shoulder 156 and a bushing 158 fits over the upper portion of the journal and seats downwardly against the shoulder 156. A generally rectangular body 160 is provided, which body is substantially identical to the body 56 described in connection with the first form of the invention. It will be observed (Fig. 12) that the lower portion 162 of the body fits over and snugly fits the bushing 158.

Also in the latter form of the invention, a modified handle 164 is provided having a yoke 166 at the inner end thereof which embraces the lower portion 162 of the body, and a pivot 168 interconnecting the yoke ends extends through the bushing 158 and an annular groove 170 in the journal 152. The pivot 168 is here shown in the form of interfitting male and female screws 172 and 174. The pivot 168 permits arm 164 to swing freely between the full-line and broken-line position shown in Fig. 11, permits the body 160 and bushing 158 to turn freely on the journal 152, and at the same time holds the head and the bushing securely on the journal 152.

A thumb nut 172 is provided which corresponds to the thumb nut 68 previously described, and the nut is press-fitted or otherwise fixed to a central pin 174. The latter extends below the thumb nut into a socket 176 provided centrally in the upper end of journal 152 and the upper end of the pin is threaded as at 178. In this form of the invention the integrally joined thumb nut 172 and pin 174 are free to slide vertically for a limited distance between the end of bearing 152 and the upper portion 180 of the body 160. The vertical movement of these parts is illustrated by the full- and broken-line positions in Fig. 12. A spring 182 is interposed between the thumb nut 172 and the upper portion 180 of the body. The lower end of the spring 182 seats in an angular groove 184 provided in the upper face of thumb nut 172 and the upper end of the spring bears upwardly against the housing 160. The spring 182 normally acts to hold the thumb nut down as shown by full lines in the drawings and in this position the upper end of pin 174 is flush with or preferably slightly below the top surface 186 of the housing. As in the form of the invention first described, the top surface of the housing is flat and smooth so as to form a comfortable hand support when the device is used as a cane; and by reason of the fact that the fastening pin 174 is normally depressed below the top of the housing, it does not form an obstruction that may be uncomfortable to the hand as in the first form of the invention. It will be readily apparent, however, that when the pin 174 is extended upwardly to the brokenline position it provides a threaded stud for attachment of a camera to the head 160.

The housing 160 is provided with a locking screw 188 that is identical in all respects to the locking screw 90 hereinabove described, except that in the modified form, screw 188 is disposed on the front of the housing opposite handle 164. Screw 188, however, operates in the same manner and serves the same function as screw 90.

The underside of handle 164 is hollow as at 190 and the curvature of the underside preferably conforms substantially to the outer surface of the staff section 12 so that the handle fits snugly and flatly against the staff when in the folded position shown by broken lines in Fig. 13. When in fully extended position, the handle 164 engages an adjustable abutment here shown in the form of a screw 192 threaded into the housing 162. In this connection it will be apparent that screw 192 can be screwed into or from the housing for a limited distance to control the fully extended position of the handle 164.

It is a feature of this invention that a pad 194 of resilient material such as rubber or the like is adhesively or otherwise secured to the underside of handle 164 preferably adjacent the upper end thereof. When the handle 164 is moved to the folded position, pad 194 engages the staff section 12 and is compressed. The handle is held in folded position by a locking sleeve 196 rotatably mounted on the staff below the end of the folded arm 164. Sleeve 196 is provided with an upstanding lip or flange 198 which extends part way around the circumference of the sleeve and is spaced circumferentially from the staff section. When the sleeve 196 is positioned as shown in Fig. 11, the arm 164 may be moved to the fully folded position; and when the sleeve is rotated to bring the lip 198 into overlying relation with the arm, the latter is held securely but detachably in the folded position.

From the foregoing it will be apparent that the pad 194 tends to push the arm 164 angularly away from the staff and that by reason of its inherent nature the pad acts as a brake which tends to prevent rotation of the head 160 on the staff. By pressing outwardly against the arm 164, pad 194 forces the lower end of the arm into pressed frictional engagement with the locking flange 198 and thus prevents inadvertent rotation of the sleeve 196 to release the arm.

When the head 160 is locked in the above manner and the prongs of the ground-engaging unit are spread, the device forms a bipod particularly suitable for still-camera work. Pictures can be taken with a longer exposure than would otherwise be possible without sacrificing clearness and detail. Also, steady support makes it possible to take pictures under poorer light conditions than would otherwise be possible and permits the user to take advantage of longer exposure with smaller f stops resulting in much greater depth and sharpness. The steady holding of a camera with a support of this type gives better pictures even with flash bulbs.

For still camera work the handle 84 in the first form of the invention may be removed entirely or in the modified form it may be simply moved to and locked in the folded position. However, for movie work the handle usually is used in the extended position and the screw 188 is adjusted to give the desired resistance to turning of the camera supporting head. When the handle is positioned in this manner it can be placed on the shoulder to steady and support both the camera and the bipod. The person taking the pictures in effect becomes a third leg on the support, and the total effect is a tripod support. Experience has demonstrated that a camera supported in this manner permits the user to pan smoothly and as slowly as desired by body movement. Also, one may easily pan in a vertical plane simply by moving the body fore and aft so as to rock the staff about pivot 122. If desired, both horizontal and vertical panning can be combined by simple body motion. Alternatively, the bipod support can be steadied on the ground or other suitable supporting surface and the handle 64 grasped manually to turn the head on the panning bearing.

Another advantage of the instant construction is that it permits excellent pictures to be taken from a moving object such as an automobile or a train. When taking movies from an automobile, for example, the lower staff section 18 is removed and the sections 14 and 16 are adjusted so that they are off the floor of the car. The supporting arm is placed on the shoulder of the user to steady the support. The lower end of the staff may be steadied against the seat of the car or against a leg of the user. When supported in this manner the staff provides a most steady camera, even though the car is in motion. The camera in effect becomes a part of the person taking the pictures and a great deal of the motion of the car is compensated by the user.

Having thus described the invention, I claim:

1. A camera support comprising a plurality of extensible and retractable telescoping members mechanically interconnected and collectively forming a staff; a pivot on and extending axially from the upper end of the staff; a camera supporting head journaled on and rotatably adjustable on said pivot; means for detachably fastening a camera to the head; an arm pivoted to the head adapted to occupy a folded position alongside the staff or to extend at right angles from the staff, in one mode of use of the device said arm adapted to rest on the shoulder of the user so as to steady the staff and to facilitate use of a camera attached to the head, in another mode of use of the device said arm serving as a manually operable lever for turning the head on the pivot so as to swing the camera in a horizontal panning movement; and a pad of resilient material on the underside of the arm engageable with the staff when the arm is in the folded position, and fastening means engageable with said arm when the latter is folded against the staff operable to hold the arm in the folded position with said pad compressed between said arm and said staff so as to lock the head securely against rotational movement on said pivot.

2. A camera support comprising a plurality of extensible and retractable telescoping members mechanically interconnected and collectively forming a staff; a pivot on and extending axially from the upper end of the staff; a camera supporting head journaled on and rotatably adjustable on said pivot; means for detachably fastening a camera to the head; an arm pivoted to the head adapted to occupy a folded position alongside the staff or to extend at right angles from the staff; a pad of resilient material on the undersurface of the arm engageable with the staff as the arm approaches the folded position and adapted to be compressed against the staff when the arm is in the extreme folded position; and a rotatable locking sleeve on the staff having an axially extending lug movable into overlapping relation with the distal end of the arm to hold the latter in folded position, said pad serving a double function of holding the arm secure and interlocked with the fastening sleeve and as a brake for preventing turning of the head relative to the staff when the arm is in folded position.

3. A camera support comprising an elongated staff, a camera supporting head pivoted on the upper end of the staff for movement about an axis coaxial to the staff; an arm pivotally connected at one end to the head adapted to occupy a folded position alongside the staff or to extend at right angles from the staff; a pad of resilient material on the undersurface of the arm engageable with the staff as the arm approaches the folded position and adapted to be compressed against the staff when the arm is in the extreme folded position; and a rotatable locking sleeve on the staff having an axially extending lug movable into overlapping relation with the distal end of the arm to hold the latter in folded position, said compressed pad serving the double function of holding the arm secure and interlocked with the locking sleeve and as a brake for resisting turning of the head relative to the staff when the arm is in folded position.

References Cited in the file of this patent
UNITED STATES PATENTS
473,357     Servus _____ Apr. 19, 1892

(Other references on following page)

UNITED STATES PATENTS

| | | |
|---|---|---|
| 713,114 | La Force | Nov. 11, 1902 |
| 937,612 | Kircher | Oct. 19, 1909 |
| 992,395 | Watrous | May 16, 1911 |
| 1,061,102 | Morton et al. | May 6, 1913 |
| 1,126,720 | Debrie | Feb. 2, 1915 |
| 1,536,985 | Swinford | May 5, 1925 |
| 1,786,308 | Latourelle et al. | Dec. 23, 1930 |
| 1,870,766 | Beistle | Aug. 9, 1932 |
| 1,878,320 | Potter | Sept. 20, 1932 |
| 2,016,744 | Heck | Oct. 8, 1935 |
| 2,204,013 | Gaidos | June 11, 1940 |
| 2,586,721 | Rubin | Feb. 19, 1952 |

FOREIGN PATENTS

| | | |
|---|---|---|
| 668,962 | France | July 13, 1929 |